350-432 SR
E297A XR 2,994,863

[redacted]

Aug. 1, 1961 F. M. TRAPNELL, JR 2,994,863

APPARATUS AND METHOD FOR GRAPHICAL TO DIGITAL CONVERSION

Filed Dec. 29, 1958 4 Sheets-Sheet 1

Aug. 1, 1961 F. M. TRAPNELL, JR 2,994,863

APPARATUS AND METHOD FOR GRAPHICAL TO DIGITAL CONVERSION

Filed Dec. 29, 1958 4 Sheets-Sheet 3

Aug. 1, 1961 F. M. TRAPNELL, JR 2,994,863

APPARATUS AND METHOD FOR GRAPHICAL TO DIGITAL CONVERSION

Filed Dec. 29, 1958 4 Sheets-Sheet 4

BINARY CODED MASK

MODIFIED BINARY CODED MASK

United States Patent Office 2,994,863
Patented Aug. 1, 1961

2,994,863
APPARATUS AND METHOD FOR GRAPHICAL TO DIGITAL CONVERSION

Frederick M. Trapnell, Jr., Poughkeepsie, N.Y., assignor to International Business Machines Corporation, New York, N.Y., a corporation of New York
Filed Dec. 29, 1958, Ser. No. 783,221
9 Claims. (Cl. 340—347)

This invention relates to apparatus and a method for deriving discrete numerical values from a representation of a quantity that varies in a substantially continuous manner over a range of values, and for storing sets of such values.

More particularly, the invention in some of its embodiments relates to means and a method for determining digital values representative of the coordinates of points on a curve, graph or contour, or image thereof—for example, an oscillogram displayed upon the screen of a cathode ray oscilloscope.

Generally speaking, the invention employs a combination of mechanical and optical means to select one coordinate, such as the abscissa, of a given point upon the curve and to project a linearly extended image of the point upon an electro-optical system for translating the geometric position of the image into a specific electric response in the electro-optical system, the response representing digitally the other coordinate, in this case the ordinate, of the given point on the curve. The digit-forming system in this case is a converter from light energy to electrical energy.

In an illustrative embodiment shown herein the apparatus of the invention may be regarded as comprising a combination of a camera with special optical properties, a rotatable mirror, a shield member containing a slit, and a collection of photocells behind a coded mask. These elements may also be supplemented by a rotatable storage device in fixed angular relation to the rotatable mirror for storing digital information received from the photocells.

An astigmatic lens system is employed to produce images of points on a curve that is being exhibited as upon the face of a cathode ray tube. Due to the astigmatic property of the lens system, images of a given luminous point of the curve take the form of a pair of mutually perpendicular lines separated in space. The rays of light emerging from the lens system are thrown upon a rotatable plane mirror, the beam from the mirror being directed upon a vertical slit located at the position of the first line image, which image is vertical in the illustrative embodiment. Consequently, the primary focal image of some particular vertical line on the face of the cathode ray tube falls on the vertical slit. As the mirror rotates, successive vertical lines of the object fall upon the slit. In terms of the abscissae and ordinates of the curve to be analyzed, the abscissa is selected by the mirror-slit combination. The second line image is made to fall upon a coded mask. This line image is horizontal and its vertical position on the mask determines which digital value is to be assigned to the ordinate of the curve. Behind the coded mask are photocells, the several outputs of which indicate the ordinate of the point under consideration in accordance with the code used in the coded mask.

The information so obtained from the cathode ray tube may be stored by causing the output currents from the photocells to make a record of the value of the ordinate on a magnetic drum at a position on the drum that corresponds to the abscissa of the point under consideration. The information stored may then be analyzed or compared to some standard set of values, or otherwise utilized.

The coded mask may have, at each vertical level, a plurality of opaque and transparent portions in various combinations differing from level to level and forming a code, e.g., a binary code, to represent ordinate values.

The apparatus of the invention, from one point of view, may be characterized as a multiple target reading digital camera or general purpose digital camera. As such, the device is generally useful for converting from visual data of continuous nature into digital data, or from an optical analog type of representation to a digital type of representation. The term "multiple target" refers to the fact that one image is formed to represent one coordinate, e.g., the abscissa, and another image is formed to represent another coordinate e.g., the ordinate.

More particularly the device of the invention may be characterized according to the specific use to which it is put, for example, the embodiment illustrated herein is a digitizing read-out device for an oscilloscope or oscillograph.

The system disclosed has among its advantages the fact that it is capable of permanently recording, as on a magnetic drum, signals occupying such a wide frequency band, say 300 to 400 megacycles per second, that with presently known techniques such signals can only be exhibited initially by a high speed device such as a cathode ray oscilloscope.

Another advantage of the device of the invention is the use of a single optical system (lens-split combination) to generate both the horizontal and vertical line images with the result that the two images are optically keyed together. Where separate optical systems are used for horizontal and vertical indications, e.g., in portions of a divided beam, there is a considerable possibility of confusion in associating a given pair of horizontal and vertical indications. This is particularly important in the case of multiple target locating devices in which case such ambiguity is eliminated by the use of the invention.

A further advantage is the direct mechanical connection of the rotatable mirror and the magnetic storage drum. A series of clock pulses may be recorded on the drum corresponding to angular positions of the mirror. Thus each clock pulse marks a unique horizontal increment of position and controls the location of the corresponding vertical line image upon the slit 30 without resort to any special synchronizing circuits.

A still further advantage is that the photocell information, which is sampled in accordance with the clock pulses, can be written into a known memory location on the drum without the need for any memory addressing circuitry.

Other features, objects and advantages will appear from the following more detailed description of an illustrative embodiment of the invention, which will now be given in conjunction with the accompanying drawings.

Figure 1:
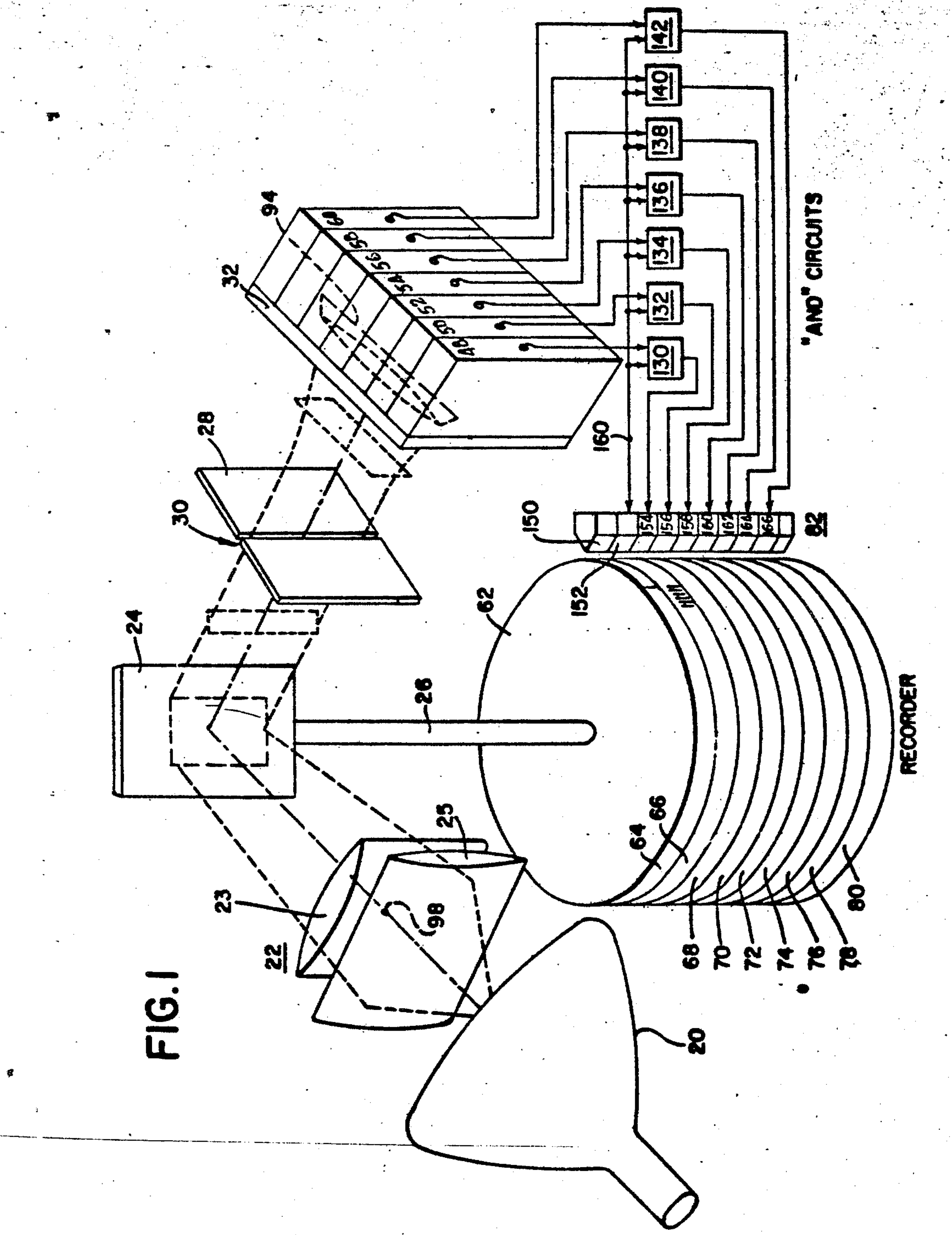
FIG. 1 is a perspective view, partly diagrammatical, of an illustrative embodiment of the invention.
Figures 3, 3A, 3B:
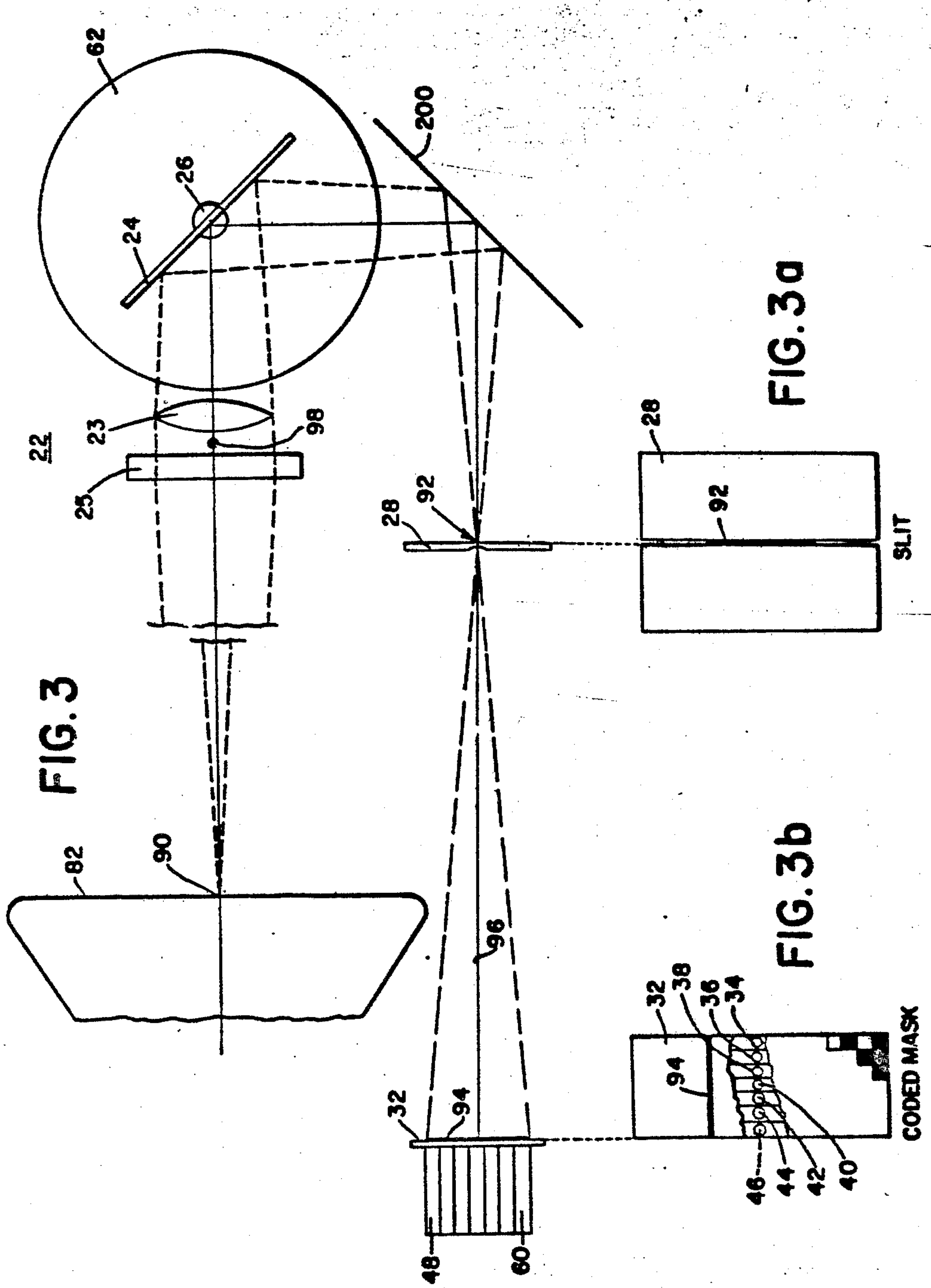
FIG. 3 is a diagrammatic showing of a plan view of an optical system similar to that employed in the embodiment of FIG. 1.
FIG. 3A is an elevational front view of a coded mask partly broken away to show photocells behind the mask.
FIG. 3B is an elevational view of a slotted mask with a vertical line image indicated schematically in the slot.

In FIG. 1 there is shown a cathode ray tube 20, and an astigmatic lens system 22 positioned to receive light from the face of the cathode ray tube and to direct a resultant light beam upon a rotatable plane mirror 24 mounted on a shaft 26. The lens system 22 is capable of producing from a point source first and second line images spaced apart and angularly disposed one to the other, and may, for example, comprise a pair of crossed cylindrical lenses 23, 25, of which lens 23 is disposed with axis vertical and is of greater curvature than lens 25, the latter lens being disposed with axis horizontal. The lenses 23, 25, are preferably double convex lenses formed with two parabolic cylindrical surfaces arranged back to back. An opaque mask 28 having a vertical linear slit 30 is mounted in the path of the reflected beam from the rotatable mirror at an optical distance from the lens system 22 equal to the primary focal distance $f_1$ of the lens system, that is, at the location of the first line image. In the path of the beam beyond the slit 30 is positioned a coded mask 32 at an optical distance from the lens system 22 equal to the secondary focal distance $f_2$ of the lens system, that is, at the location of the second line image. Beyond the coded mask are mounted a plurality of photocells 34, 36, 38, 40, 42, 44 and 46 (FIG. 3B). Each of these photocells is contained in a box of light-proof material indicated at 48, 50, 52, 54, 56, 58 and 60, respectively, the front of each box being formed by a portion of the mask 32.

Fixedly mounted upon the shaft 26 is a recorder comprising a magnetic drum type of storage device 62, providing space upon its cylindrical surface for a plurality of recording tracks, including a home pulse track 64, a clock track 66 and data tracks 68, 70, 72, 74, 76, 78 and 80. Transducing heads, adapted for both reading and writing are contained in a head assembly 82, which may include individual transducing heads for use with the home pulse track, the clock track, and the various data tracks.

The photocells 34, 36, 38, 40, 42, 44, 46 have their outputs connected respectively to a plurality of "and" circuits 130, 132, 134, 136, 138, 140, 142. The head assembly 82 comprises head 150 for use with the home pulse track 64, head 152 for use with clock track 66, and heads 154, 156, 158, 160, 162, 164, 166 for use respectively with data tracks 68, 70, 72, 74, 76, 78, 80. A second input connection to each of the "and" circuits comes from the clock track head 152 via a lead 160. The respective outputs of the "and" circuits are connected to the data heads 154, 156, 158, 160, 162, 164, 166. The "and" circuits are of any known type, the function of an "and" circuit being the usual one of producing an output current or potential if and only if a suitable current or potential is present on all of its input circuits. For example, if A and B are suitable inputs respectively for the two input circuits of a given "and" circuit, then both A and B must be present in order that there shall be an output produced by the "and" circuit.

Figure 2:
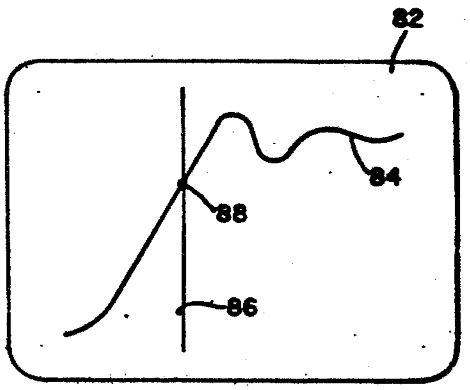
FIG. 2 is an elevational view of the useful portion of the face of a cathode ray tube such as is included in the system of FIG. 1.

FIG. 2 shows the useful portion of the face 82 of the cathode ray tube 20 displaying a luminous curve 84 representing data which it is desired to reduce to digital form. More particularly, the curve 84 may be regarded as depicting a function $$y=f(x)$$

where $x$ may be the abscissa and $y$ the corresponding ordinate of any point on the curve and it is desired to obtain in digital form values of $y$ corresponding to values of $x$. The vertical line 86 represents the portion of the face of the tube 20 which is momentarily projected upon the slit 30 of the mask 28. The spot 88 at the intersection of the curve 84 and the line 86 is a point of the curve the ordinate of which is to be translated into digital form at the instant when the line 86 falls upon the slit 30.

Figure 6:
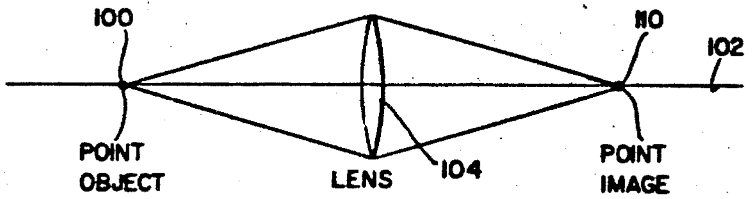
FIG. 6 is an optical schematic diagram of an idealized lens system in which a point object produces a point image.

FIG. 3 shows in plan view the manner in which images of a point source such as point 88 are formed by the action of the astigmatic lens system. A point source 90 on the face 82 forms a vertical line image 92 at the primary focus of the lens system and a horizontal image 94 at the location of the coded mask. At positions in the beam other than the focal positions the image form will be blurred and roughly rectangular or more or less elliptical shape. It will be seen that the vertical image 92 projects light on through the vertical slit 30 and that the horizontal image 94 extends horizontally across the face of the coded mask 32. As will be explained more fully in conjunction with FIGS. 6–8, it is a property of the astigmatic lens system that the central ray 96 from the source 88 passes through both images 92, 94 with the result that if source 88 moves downward, horizontal image 94 moves correspondingly upward, or vice versa, the ray 96 pivoting about the center point 98 of the lens system. Motion of the vertical image 92 takes place within the slit 30 during any vertical motion of the source 88.

To save space on the drawing in FIG. 1, the cathode ray tube 20 is shown relatively close to the center point 98 of the lens system compared to the distance of the mask 32 from the center point. In practice, it will generally be desirable to place the center point further from tube 20 and closer to mask 32 as indicated in FIG. 3 in order that the vertical range of motion of the secondary line image 94 will remain within the limits of the height of the mask 32.

Figure 4:
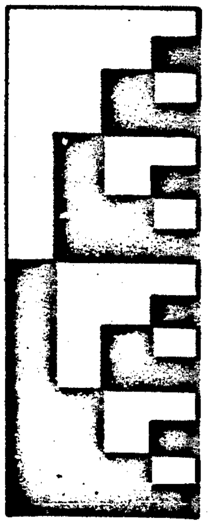
FIG. 4 is a detailed front elevational view of a coded mask suitable for use in accordance with the invention.
Figure 5:
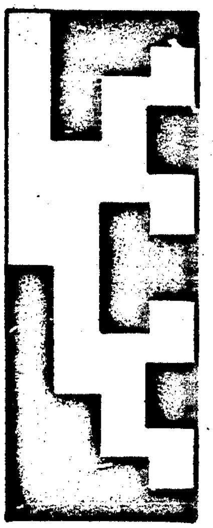
FIG. 5 is a front elevational view of an alternative form of a coded mask.

FIGS. 3A, 4 and 5 show alternative forms of the coded mask 32 in front view. The face of the mask is divided into horizontal portions which determine for each photocell whether or not light will be admitted to the cell when the horizontal image line 94 falls upon that particular horizontal portion of the mask. Any suitable binary code may be used, comprising combinations of opaque and transparent areas in known maner. Using seven photocells, as illuminated in FIGS. 1 and 3A, 128 different values of ordinate or y-values may be distinguished. Either more or less than seven photocells may be used according to the degree of resolution desired. For the sake of clarity in the drawing, FIGS. 4 and 5 show forms which the mask 32 may take when only four photocells are employed, giving a total of sixteen distinguishable y-values in the case of each of the two figures.

The coded mask 32 in the embodiment illustrated in FIGS. 1 and 3A is assumed to consist of 128 distinct horizontal strips varying in vertical position to cover the range of y-values which the curve may exhibit. The y-value of each vertical position is distinguished by a combination of transparent and opaque portions which may, for example, represent in binary form integers from 0 to 127, inclusive. A straight binary code may be used, or some variation of the straight binary code may be substituted as desired. In a preferred form, the so-called Gray binary code is used as illustrated in FIG. 5. In this code, adjacent combinations differ in respect to one digit only. As a result, as the horizontal line image moves over the face of the coded mask, only one photocell at a time is affected, the cell changing either from a conducting to a non-conducting condition or vice versa.

In terms of correspondences or mappings, it will be noted that vertical lines on the face of the cathode ray tube map through the rotatable mirror in one to one fashion onto vertical lines on the slotted opaque mask 28, the rotational position of the mirror determining which vertical strip will map into the slit 30 at any given instant. These vertical strips represent small increments $\Delta x$, of position along the horizontal axis of the face of the cathode ray tube. The mirror 24 will, when continuously rotated, sweep the image of the face of the tube across the slit 30 once in each revolution. Thus light emitted as by phosphorescence from the face of the cathode ray tube from positions of increasing abscissa or $x$-value is permitted to pass through the slit. Vertical positions, or $y$-values, on the cathode ray tube map onto unique vertical positions of the projected horizontal line of light on the coded mask 32. Thus the output of the photocells corresponds to the value of $y(x)$ selected through the slit 30 by the mirror 24. In this way there are obtained digitized values of $y$ as a function of $x$, presented in binary form as voltage or current states at the outputs of the photocells.

Sufficient for the purposes of the invention, the action of an astigmatic lens system may be explained approximately in the following manner. For comparison, it will first be recalled that in the case of an ideal anastigmatic lens system a point object produces a point image. This is indicated diagrammatically in FIG. 6 where a point object 100 shown as being located on the optical axis 102 of a convex lens 104 sends out divergent rays which impinge upon the lens. Convergent rays from the lens form a point image 110.

Figure 7:
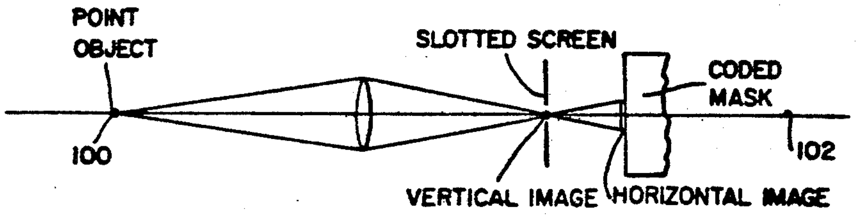
FIGS. 7 and 8 are optical schematic diagrams useful in explaining the properties of an astigmatic optical system such as is illustrated in FIGS. 1 and 3.
Figure 8:
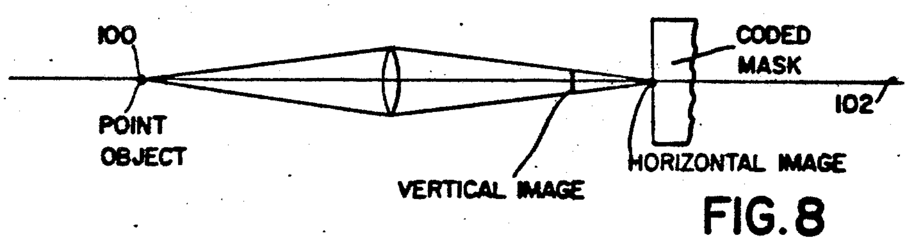

FIGS. 7 and 8 serve to illustrate the approximate action of an astigmatic lens system such as the lens system 22 of FIG. 1 and supplement the diagrammatic showings of FIGS. 1 and 3. As in FIG. 6, the point object 100 in FIG. 7 sends out divergent rays which impinge upon an astigmatic lens system which is represented schematically in top view at 112. The lens system forms a vertical image 114 at the location of the slotted screen and a horizontal image 116 at the coded mask. FIG. 8 shows a schematic side view of the same system illustrated in FIG. 7.

Point objects located off the axis 102 will form similar pairs of line images and a ray from any point object to the middle of the first line image will pass approximately through the middle of the second line image, thereby insuring the necessary one to one correspondence between the ordinate $y$ on the curve 84 displayed on the face of the tube 20 in FIG. 1 and the vertical position of the horizontal line image 94 with respect to the coded mask 32, so that the photocells serve to read out the value of the ordinate of the curve to be analyzed.

For a further detailed discussion of the properties of an astigmatic lens system and for additional forms of such systems, reference may be made to "Introduction to Theoretical and Experimental Optics," by Joseph Valasek, John Wiley & Sons, 1949, beginning at page 45.

To summarize the operation of the system of FIGS. 1 and 3, the cathode ray tube 20 displays on its face the curve 84 as indicated in FIG. 2. An astigmatic image of the curve is produced by the lens system 22 which throws a beam upon the rotatable mirror 24. The mirror sweeps the beam across the surface of the opaque mask 28, forming vertical line images of successive points of the curve upon the slit 30. The associated horizontal line images of successive points of the curve fall upon the surface of the coded mask 32 and cause combinations of the photocells to be illuminated so that successive ordinate values are represented by combinations of output currents from the respective photocells in accordance with the code incorporated in the mask 32.

The magnetic reading and writing heads in the assembly 82 are placed so as to read the home pulse in track 64 at the time that the image of the left-hand edge of the usable portion of the cathode ray tube face is projected upon the slit 30. Then, as the mirror 24 continues to rotate, the output of the photocells is sampled through the respective "and" circuits each time a clock pulse in track 66 passes under the clock reading head 152. The samples are recorded directly and immediately in the respective data track 68, 70, etc. on the drum 62. Photocell 34 feeds information into data track 68, cell 36 into track 70, etc., each photocell feeding a particular track. When the device has scanned the entire useful face of the cathode ray tube, all the sampled and digitized $y$-data has been stored on the magnetic drum, each $y$-value in a separate register corresponding to its associated $x$-value.

The stored information may be used, for example, to obtain such characteristic properties of the analyzed curve as rise time, amplitude, slope, overshoot, etc. The information may be utilized as an inspection device or check-out on a production line where the thing produced is required to have a certain specified wave form of output. In such a case the specified or standard wave form, or waveforms, may be stored in additional tracks on the drum adjacent to the data tracks 68, 70, etc. to facilitate immediate and direct comparison between the exhibited waveform and a standard waveform.

For use with a 5ABP7-type cathode ray tube having a useful tube face area measuring 3½ inches horizontally and 2½ inches vertically, a suitable astigmatic lens system might have, for example, a primary focal length of two and one-half inches and a secondary focal length of four and one-half inches. A fixed reflecting mirror 200 may be inserted in the path of the beam to conserve space as shown in FIG. 3 without interfering with the operation of the system. The magnetic storage drum may be mounted coaxially with the rotating mirror and have a radius of 2.86 inches, for example. The image of the cathode ray tube face then subtends approximately 20 degrees of the rotational arc of the mirror and may be divided into 128 samples by means of 128 clock pulse marks in the clock track. The resulting packing density of the drum is 128 bits per inch along the periphery of the drum. Consequently, 128 samples from the photocells may be recorded in one peripheral inch on the drum. Likewise the 128 clock pulse marks will occupy one peripheral inch on the drum.

The number of samples may be more or less than the number of distinguishable ordinate values. The more samples, in general, the better resolution horizontally, and the more ordinate values distinguishable, in general, the better resolution vertically. Where the curve is steep, the more frequent the samples, the more accurate the analysis of the curve. Where the curve is less steep, less frequent samples are needed for the same accuracy. For ordinary purposes, however, the number of samples per unit horizontal length of the useful display area should be approximately the same as the number of ordinate values distinguishable per unit vertical height of the useful display area.

The first and second linear images are preferably mutually perpendiclar. If there is a material departure from this angular difference between the images complications are likely to arise in which the value of the ordinate will be affected by the value of the abscissa and vice versa. It will also be evident that the terms "horizontal" and "vertical" as applied to the respective images produced by the astigmatic lens system are relative and refer to any actual directions which are optically or mechanically associated in one to one correspondence with the directions of the ordinate and abscissa respectively of the points on the curve.

While a cathore ray tube has been illustrated for displaying the curve in luminous form, other means of display may be substituted, for example, a photographic negative, a photographic print, or printed reproduction. The curve may in some instances be the contour of a suitable object, or an image thereof, for example, the contour of a geographical object as viewed in a camera, and need not necessarily be confined to a substantially plane surface. Although there are some advantages in employing a curve which appears bright or luminous against a dark background, other arrangements may in some instances be employed, including a dark contour against a lighter adjacent region, provided there is suitable contrast of illumination in the region of the contour. Although certain coded masks have been shown which are suitable for use with the components of the system illustrated, and which have certain definite advantages, it will be understood that other coded masks may advantageously be employed in some instances for causing the illumination striking the photocells to vary, depending upon the ordinate of the point of the contour selected at a given moment, so that the resulting output signals from the combination of photocells are indicative of the ordinate of the point.

The signals produced by the photocells may be used to set combinations of relays, to control the punching of punch cards, to write a record into a memory device inside an automatic digital computer, etc., it not being necessary that the recording register or other recording device be mechanically coupled directly to the curve-analyzing system as illustrated by the showing of the shaft 26. As pointed out herein, however, there are definite advantages in the direct mechanical coupling.

Where a graph or curve is specified in the description or claims it is to be understood to include any suitable contour.

While an illustrative form of apparatus and a method in accordance with the invention have been described and shown herein, it will be understood that numerous changes may be made without departing from the general principles and scope of the invention.

What is claimed is:

1. A system for analyzing a graph displayed on a substantially plane surface, said system comprising, in combination, an astigmatic lens system having first and second focal regions wherein are formed linearly extended vertical and horizontal images respectively corresponding to a given point source, a slotted plate positioned in said first focal region with the slot in a vertical direction, a rotatable mirror positioned to reflect upon said slot successive vertical images derived from successive portions of said graph, and a plurality of photosensitive devices arranged in a horizontal array in said second focal region to receive a horizontal line image from the said successive portions of the graph for analyzing and encoding the vertical coordinate of the graph.

2. A system for analyzing a graph displayed in luminous form on a substantially plane surface, said system comprising, in combination, astigmatic optical means for producing a pair of linearly extended images from a point source of light on said graph, means comprising a first mask having a slit therein aligned with one of said images to determine the abscissa of a given point on said graph and means comprising a second mask having apertures aligned with the other said image for using the other said image to determine the ordinate of the said given point.

3. Apparatus according to claim 2, in which the said astigmatic optical means comprises a pair of cylindrical lenses having their axes angularly disposed to each other.

4. Apparatus according to claim 3, in which the said cylindrical lenses are disposed with the respective cylindrical axes mutually perpendicular.

5. A system for determining digital values for points on a curve that is displayed in luminous form, comprising, in combination, an astigmatic lens system for producing a pair of linearly extended images from a given point of said curve, means including a first opaque mask having a slit aligned with one of said images to determine the abscissa of the given point, and means including a second opaque mask having a plurality of transparent portions for determining the ordinate of said given point.

6. A system for analyzing a curve displayed in luminous form on a substantially plane surface, said system comprising, in combination, an astigmatic lens system having first and second focal regions wherein are formed a pair of mutually perpendicular substantially linear images corresponding to a single point source, a slotted mask located in said first focal region and having a substantially linear slot therein extending in a direction parallel to the direction of the said linear image in said region, a rotatable mirror located between said lens system and said slotted mask for reflecting light from successive portions of said curve upon said slot, and light sensitive means for sensing the relative position of the said linear image in said second focal region.

7. A system for analyzing a curve displayed in luminous form on a substantially plane surface, said system comprising, in combination, an astigmatic lens system focused upon said surface and having the property of forming a pair of linear images of a point source, said images appearing at unequal distances from said lens system, the said images being angularly disposed with respect to each other by an angle of rotation about the ray through the center of the lens system, means located between the lens system and the region of the said images for rotating the beam from the lens system about an axis perpendicular to said beam and parallel to the nearer of said images, a mask located in the region of the nearer image and having a slit therein, said slit extending in the same direction as the said nearer image, whereby linear images of successive points on said curve are formed within said slit, and a coded mask located in the region of said farther image for sensing displacement of said farther image in a direction perpendicular to the direction of said farther image.

8. A system for reading and recording coordinates of a curve displayed on the face of a cathode ray tube comprising, in combination, astigmatic optical means for projecting a pair of linear images of any given point on said curve, said means having first and second focal regions at different distances from said optical means, in which respective regions the image is linearly extended in different directions, rotating optical means for in effect sweeping said images through an angle in space, an opaque mask in the path of sweep of said images, said mask being located in the first focal region of the said astigmatic means and said mask having a slit therein parallel to the direction of the image in said first focal region, a coded mask having a plurality of transparent portions, said coded mask being located in the second focal region of the said astigmatic means, a plurality of photocells located behind said coded mask, each said cell being exposed to light through one or more of the transparent portions of said coded mask, a storage drum rotatably mounted in fixed angular relationship to said rotatable optical means, said drum including a plurality of storage tracks including a timing track, a plurality of reading-writing heads each individual to one of said tracks, a plurality of "and" circuit, first and second input circuits for said "and" circuits, means connecting the outputs of said photocells respectively to the first input circuits of the "and" circuits, means connecting the head for said timing track to the second inputs of all said "and" circuits, and means connecting the outputs of the said "and" circuits to a plurality of storage tracks of said drum.

9. A system for determining digital values for points on a curve, comprising, in combination, an astigmatic lens system having first and second focal regions wherein are formed a pair of mutually perpendicular substantially linear images corresponding to a given point source, said lens system being positioned to receive and transmit light from a field of view including said curve, a slotted mask located in said first focal region and having a substantially linear slot therein extending parallel to said linear image in said region, a movable optical device located beyond said lens system positioned to direct an image of successive points of said curve upon said slot in said slotted mask, whereby movement of said device is representative of one of the coordinates of a selected point on said curve, a coded mask having a plurality of transparent portions, said mask being located in the second focal region of the said astigmatic lens system, a plurality of photoelectric devices located behind said coded mask positioned respectively to receive light through said transparent portions thereof, said transparent portions of said mask being so located with respect to said photoelectric devices that, for agiven value of the other coordinate of said selected point on said curve, light from the region of said selected point passes through a particular combination of said transparent portions and thereby energizes a particular combination of said photoelectric devices to produce output signals representative of said other coordinate of said selected point of said curve.

References Cited in the file of this patent

UNITED STATES PATENTS

| | | |
|---|---|---|
| 1,931,852 | Reichel et al. | Oct. 24, 1933 |
| 2,801,343 | Johnson | July 30, 1957 |
| 2,897,481 | Shepard | July 28, 1959 |